United States Patent [19]
Kieffer et al.

[11] Patent Number: 5,566,537
[45] Date of Patent: Oct. 22, 1996

[54] MOWER WITH A SAFETY DEVICE

[75] Inventors: Fernand Kieffer, Saverne; Rene Walter, Goetzenbruck; Horst Neuerburg, Saverne, all of France

[73] Assignee: Kuhn S.A., Saverne Cedex, France

[21] Appl. No.: 432,066

[22] Filed: May 1, 1995

[30] Foreign Application Priority Data

Apr. 29, 1994 [FR] France .................................. 94 05429

[51] Int. Cl.⁶ ............................ A01D 34/66; A01D 34/82
[52] U.S. Cl. .................................... 56/15.2; 56/6; 56/15.8
[58] Field of Search ............................ 56/15.2, 6, 15.7, 56/15.9, 15.1, 15.6, 15.8, 13.5, 15.3

[56] References Cited

U.S. PATENT DOCUMENTS

| | | | |
|---|---|---|---|
| 4,974,399 | 12/1990 | Haberkorn | 56/15.2 X |
| 5,060,462 | 10/1991 | Helfer et al. | 56/15.8 X |
| 5,241,809 | 9/1993 | Wolff et al. | 56/16.2 |
| 5,337,544 | 8/1994 | Lauritsen | 56/6 X |
| 5,353,579 | 10/1994 | Wolff | 56/6 X |
| 5,353,580 | 10/1994 | Wolff | 56/15.8 X |
| 5,423,165 | 6/1995 | Walch et al. | 56/6 |

FOREIGN PATENT DOCUMENTS

| | | |
|---|---|---|
| 0512602 | 11/1992 | European Pat. Off. . |
| 1265333 | 5/1961 | France . |
| 2384431 | 3/1978 | France . |
| 1582356 | 10/1967 | Germany . |
| 9002867 | 7/1992 | Netherlands . |
| 822604 | 10/1959 | United Kingdom . |
| 1199052 | 7/1970 | United Kingdom . |

Primary Examiner—Terry Lee Melius
Attorney, Agent, or Firm—Oblon, Spivak, McClelland, Maier & Neustadt, P.C.

[57] ABSTRACT

A mower includes a cutting mechanism, an attachment structure, a carrying beam connected to the cutting mechanism by way of a first articulation and to the attachment structure by way of a second articulation and a third articulation, and a safety device including an energy accumulator. The safety device includes a pivoting member connected to the attachment structure by way of a fourth articulation and a connecting rod installed between the pivoting member and the cutting mechanism or the carrying beam. The energy accumulator is connected to the pivoting member by way of a connection which is capable, from a certain angle of pivoting of the cutting mechanism toward the rear, about the axis of the third articulation, of reducing the lever arm with which the energy accumulator acts on the pivoting member.

48 Claims, 10 Drawing Sheets

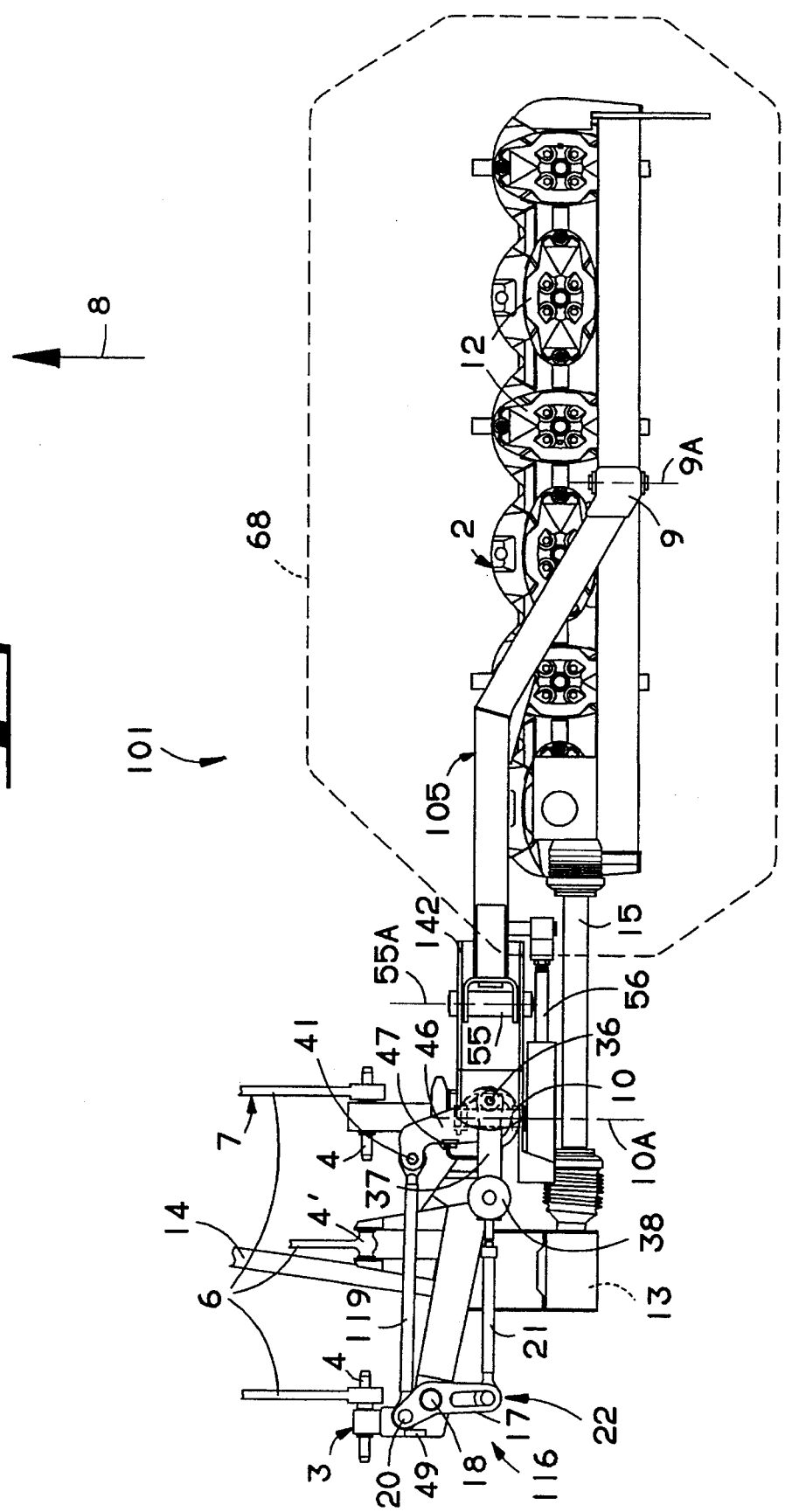

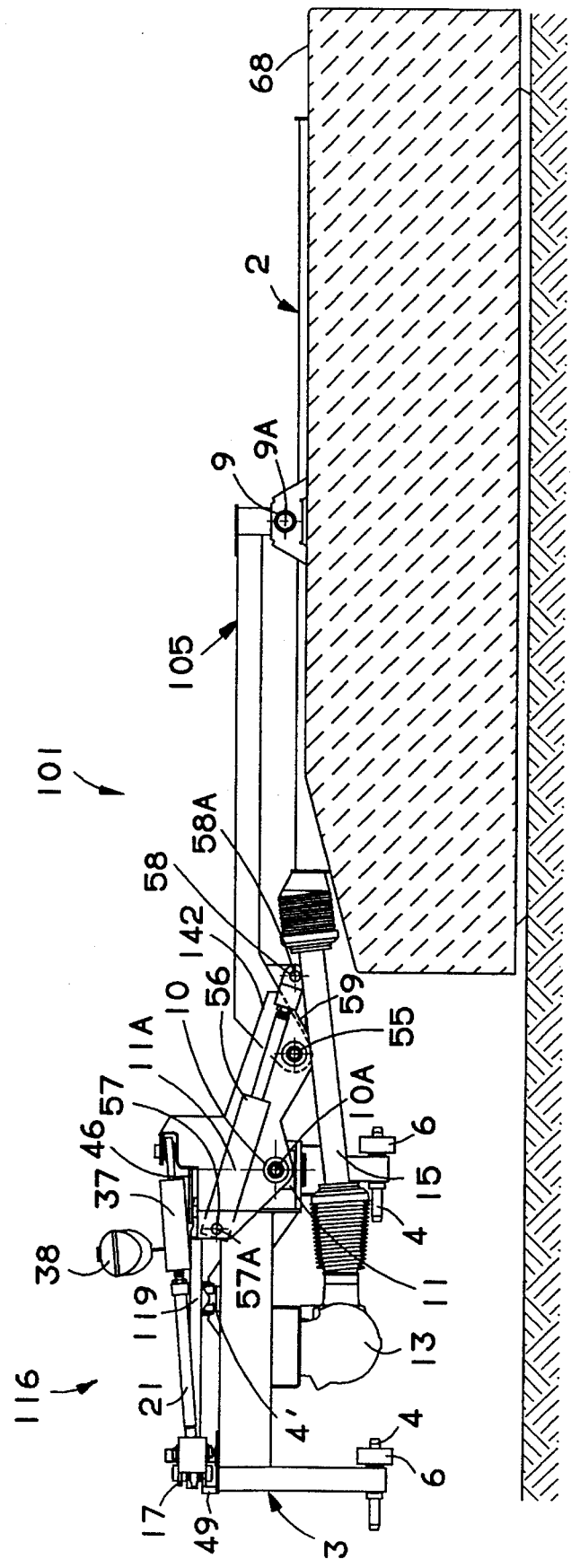

MOWER WITH A SAFETY DEVICE

BACKGROUND OF THE INVENTION

1. Field of the Invention

The present invention relates to a mower which includes a cutting mechanism which during operation extends transversely to the direction of operation; an attachment structure which is to be connected to a motorized vehicle; and a carrying beam connected on one hand to the cutting mechanism by means of a first articulation with an axis directed forward, and on the other hand to the attachment structure by means of a second articulation with an axis directed forward and by means of a third articulation with an axis directed upward, which allows pivoting of the second articulation with respect to the attachment structure.

The mower of the present invention further includes a safety device which holds the cutting mechanism in normal operating position, but allows it to pivot rearwardly about the axis of the third articulation in case an obstacle is encountered, said safety device including an energy accumulator.

2. Discussion of the Background

Such a mower is described in document FR-A-2,384,431. The safety device of this mower includes a traction spring. The spring is connected at one of its ends to the cutting mechanism in the vicinity of the first articulation, connecting the cutting mechanism to the carrying beam. At its other end, the traction spring is connected to a support fixed to the attachment structure. Bars, which are parallel to the traction spring, limit the elongation of the traction spring.

During normal operation, the cutting mechanism, which is in contact with the ground, follows the relief of the terrain by means of the first articulation which connects the cutting mechanism to the carrying beam, and by means of the second articulation which connects the carrying beam to the attachment structure. Considering the arrangement of the traction spring, a large part of the weight of the cutting mechanism is transferred to the attachment structure and at last to the tractor to which the attachment structure is connected. In this manner, the cutting mechanism rests only with slight pressure on the ground as is perfectly known in the art of mowing machines. The traction spring thus performs a primary function of lightening the cutting mechanism.

When the cutting mechanism strikes an obstacle found in the field, it pivots together with the carrying beam toward the rear about the axis of the third articulation which connects the second articulation to the attachment structure. While accomplishing this, the cutting mechanism tightens the traction spring which has the effect of further lightening the cutting mechanism, even simply lifting it, thereby facilitating its passage over the obstacle. When the obstacle no longer acts on the cutting mechanism, the traction spring brings the cutting mechanism and the carrying beam back to normal operation position. The same traction spring thus carries out a second function of safety in case of striking an obstacle, thereby protecting the mower.

This safety device offers the important advantage of resetting itself automatically as soon as the obstacle is cleared and/or no longer acts on the cutting mechanism, contrary to other existing safety devices which require a series of steps to be reset if they become disengaged.

This safety device, however, has the disadvantage of being very sensitive to the configuration of the ground. Indeed the terrain areas to be mowed are not entirely flat surfaces, but have a large number of more or less large bumps. The safety device reacts to almost every one of these bumps, which in turn almost constantly cause small pivotal movements of the cutting mechanism and the carrying beam about the axis of the third articulation. This continual working is harmful to the quality of cutting and causes vibrations which are harmful to the operational durability of the mower and are very annoying to the driver because they are transmitted to the tractor via the attachment structure.

Another disadvantage of this safety device lies in the fact that at the time an obstacle is encountered, the stresses caused in the different elements of the mower increase in proportion to the angle of pivoting of the cutting mechanism.

SUMMARY OF THE INVENTION

An object of this invention is to eliminate the disadvantages of the safety device of this mower while preserving the advantage of automatic resetting when an obstacle is cleared and/or no longer acts on the cutting mechanism.

For this purpose, the mower in accordance with the present invention includes a cutting mechanism which during operation extends transversely to the direction of operation; an attachment structure which is to be connected to a motorized vehicle; a carrying beam connected on one hand to the cutting mechanism by means of a first articulation with an axis directed forward, and on the other hand to the attachment structure by means of a second articulation with an axis directed forward and by means of a third articulation with an axis directed upward, which allows pivoting of the second articulation with respect to the attachment structure; and a safety device which holds the cutting mechanism in normal operating position, but allows it to pivot rearwardly about the axis of the third articulation in case an obstacle is encountered, this safety device including an energy accumulator.

The said mower being characterized in that the safety device further comprises a pivoting member connected to the attachment structure by means of a fourth articulation, and a connecting rod connected on one hand directly or indirectly to the carrying beam or to the cutting mechanism with a first lever arm with respect to the axis of the third articulation, and on the other hand to the pivoting member by means of a fifth articulation, the energy accumulator being connected to the pivoting member by means of a connection so as to act on said pivoting member with a second lever arm, said connection being capable, from a certain pivoting angle of the cutting mechanism toward the rear, of decreasing said second lever arm with which the energy accumulator acts on the pivoting member.

In the present mower, the energy accumulator acts on the pivoting member with said second lever arm and thus forces the pivoting member to act in turn on the connecting rod which transmits the force to the carrying beam and/or to the cutting mechanism to finally maintain the cutting mechanism in normal operating position.

Considering the kinetic aspects of the safety device, the cutting mechanism is held firmly in normal operating position. The phenomenon of continual pivoting which occurs on the mower of the prior art is not present in this case.

In this position, the cutting mechanism can move in height to follow the relief of the terrain to be mowed by means of the first articulation and the second articulation.

If during operation the cutting mechanism strikes an obstacle located in the field, and if the force on the cutting mechanism which thereby results exceeds a predetermined value, the cutting mechanism will pivot together with the carrying beam rearwardly about the axis of the third articulation connecting the second articulation to the attachment structure. If this occurs, the cutting mechanism or the carrying beam will act on the pivoting member via the connecting rod, causing it to pivot about the axis of the fourth articulation. The pivoting member will then act on the energy accumulator which has the effect of increasing the force exerted by the energy accumulator, and finally, the forces on the cutting mechanism will increase as a function of the angle of the pivoting of the cutting mechanism.

If the obstacle can be cleared during this first phase of disengagement, the energy accumulator will again bring the cutting mechanism to normal operating position as soon as the obstacle no longer acts on the cutting mechanism.

If the obstacle cannot be cleared during the first phase, the pivoting of the cutting mechanism toward the rear will continue until the pivoting angle of the cutting mechanism reaches a predetermined value. As soon as this limiting angle is reached, the connection which couples the energy accumulator to the pivoting member will decrease the second lever arm with which the energy accumulator acts on the pivoting member. This is the beginning of the second phase of disengagement. This decrease of the second lever arm will cause a redistribution of forces in the safety device and will considerably decrease the force required to continue wearing away of the cutting mechanism in front of the obstacle by continuing the pivoting of the cutting mechanism toward the rear about the axis of the third articulation.

By a wise choice of the relative position of the various articulations of the safety device, the force required to continue the pivoting of the cutting mechanism during the second phase can remain at least approximately constant, or can even diminish while the energy stored by the energy accumulator continues to increase. This is beneficial for the different elements of the mower.

As soon as the obstacle no longer acts on the cutting mechanism, the energy stored by the energy accumulator will again bring the cutting mechanism into normal operating position. The connection connecting the energy accumulator to the pivoting member will also return to normal operating position.

According to another characteristic of the invention, it can be provided that the connection connecting the energy accumulator to the pivoting member be capable of rapidly decreasing the second lever arm with which the force exerted by the energy accumulator acts on the pivoting member. The decrease of the force exerted on the cutting mechanism will therefore also be very quick, if not instantaneous.

The connection connecting the energy accumulator to the pivoting member can further include a sixth said articulation whose axis will advantageously be at least approximately parallel to the axis of the fourth articulation.

In one embodiment, the connection can also include a groove allowing the modification of the position of the sixth articulation with respect to the fourth articulation.

The connection can further include at least one roller wheel whose axis of rotation will constitute the axis of the sixth articulation and which will roll in the groove. In this case the connection will advantageously include at least one roller wheel on both sides of the direction of the force exerted by the energy accumulator, these roller wheels each being intended to roll along a corresponding track of the groove. Preferably, these roller wheels will extend at least approximately symmetrically on both sides of the direction of the force exerted by the energy accumulator.

In another implementation, the connection can also include a pivoting lever connected to the pivoting member by means of a joint and to which the energy accumulator will be connected by means of the sixth articulation which will be provided beyond the said joint. The pivoting of the pivoting lever with respect to the pivoting member about the axis of the said joint will be limited by two stops fixed to the pivoting member. The axis of this joint will advantageously be at least approximately parallel to the axis of the fourth articulation.

The straight line passing on the one hand through the axis at the sixth articulation when it is located in its first extreme position, and on the other hand through the axis of the sixth articulation when it is located in its second extreme position, can at least approximately intersect the axis of the fourth articulation. The geometric axis which intersects the axis of the fourth articulation and the axis of the fifth articulation can also form an obtuse angle with the said straight line. Advantageously this obtuse angle will be, in normal operating position, open toward the side opposite the one where the cutting mechanism extends. Moreover during normal operation, the said straight line can form an angle slightly greater than 90°, with the direction of the force exerted by the energy accumulator.

It can also be advantageously provided that the normal operating position of the sixth articulation with respect to the fourth articulation be adjustable by means of an adjusting device. Preferably, this adjusting device will essentially adjust the second lever arm with which the energy accumulator acts on the pivoting member. It will therefore be possible to adjust the value at which the cutting mechanism will begin the first phase of disengagement.

The direction of the force exerted by the energy accumulator can pass at least approximately orthogonally through the axis of the sixth articulation.

The energy accumulator can be connected directly or indirectly to the attachment structure or to the carrying beam, or even to the cutting mechanism, by means of a seventh articulation whose axis can advantageously be at least approximately parallel to the axis of the fourth articulation.

The seventh articulation can extend in the vicinity of the third articulation and, preferably, beyond the third articulation, on the side of the cutting mechanism.

When the connection connecting the energy accumulator to the pivoting member includes a sixth articulation, it can further be advantageously provided that in normal operating position the axis of the third articulation, the axis of the sixth articulation, and the axis of the seventh articulation be at least approximately in alignment.

The connecting rod can be attached directly or indirectly to the carrying beam or to the cutting mechanism by means of an eighth articulation whose axis can be at least approximately parallel to the axis of the fourth articulation.

Moreover the geometric axis which intersects the axis of the third articulation and the axis of the eighth articulation can form an obtuse angle with the longitudinal axis of the cutting mechanism.

The axis of the fourth articulation can be directed upward and preferably will be at least approximately vertical. The axis of the fourth articulation can further be at least approximately parallel to the axis of the third articulation.

In normal operating position the energy accumulator and the connecting rod can extend transversely to the direction of operation, preferably at least approximately parallel to the cutting mechanism.

According to another characteristic, it can be provided that the pivoting member be able to pivot about the axis of the fourth articulation in a certain predetermined angular range. In this case, the angular range can be determined by stops fixed to the attachment structure and intended to work with the pivoting member.

The second articulation and the third articulation can extend in the vicinity of one another, their axes preferably intersecting.

The pivoting angle of the cutting mechanism at which the second lever arm with which the energy accumulator acts on the pivoting member decreases, can have a value of approximately ten degrees.

The energy accumulator can include a jack and a pressure accumulator. In this case the inflation pressure of the pressure accumulator advantageously will be adjustable.

The connecting rod can comprise a jack. Thus, the cutting mechanism can be placed in transport position, by pivoting about the axis of the third articulation. In this case, the pivoting of the cutting mechanism toward the front or toward the front and toward the rear will be advantageously limited by a respective stop. In transport position, the pivoting of the cutting mechanism about the axis of the first articulation and the pivoting of the carrying beam about the axis of the second articulation will advantageously be blocked. Preferably this blocking will be accomplished automatically during pivoting in transport position.

The energy accumulator can be connected directly or indirectly to the carrying beam or to the cutting mechanism by means of a seventh articulation whose position with respect to the second articulation will be such that the energy accumulator will reduce the pressure with which the cutting mechanism rests on the ground.

The safety device can thus also fulfill a function of lightening the cutting mechanism. Moreover it can be advantageously provided that during the second phase of disengagement the force exerted by the energy accumulator will become sufficient to raise the cutting mechanism from the ground and lift it so that it can pass over the obstacle, depending on the nature of the latter.

The carrying beam can be connected to the attachment structure by means of an intermediate piece which itself is connected to the attachment structure by means of the second articulation, the carrying beam being connected to this intermediate piece by means of a ninth articulation with an axis directed forward. The carrying beam together with the cutting mechanism can then be pivoted upward in transport position about the axis of this ninth articulation.

The energy accumulator can moreover be connected directly or indirectly to the intermediate piece by means of a seventh articulation and the pivoting of the carrying beam with respect to the intermediate piece about the axis of the ninth articulation can be limited at least downward by a stop. Therefore, in this embodiment the energy accumulator can also reduce the pressure with which the cutting mechanism rests on the ground during operation.

A maneuvering element can further be installed between the intermediate piece and the carrying beam in order to cause pivoting of the carrying beam and the cutting mechanism upward about the axis of the ninth articulation. This maneuvering element can advantageously be a jack.

The axis of the first articulation and/or the axis of the second articulation and/or the axis of the ninth articulation can be at least approximately directed in the direction of operation.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings wherein:

FIG. 10 shows a top view of a mower in normal operating position according to a second example of implementation;

FIG. 11 shows a rear view of the mower of FIG. 10;

DESCRIPTION OF THE PREFERRED EMBODIMENTS

Figure 1:
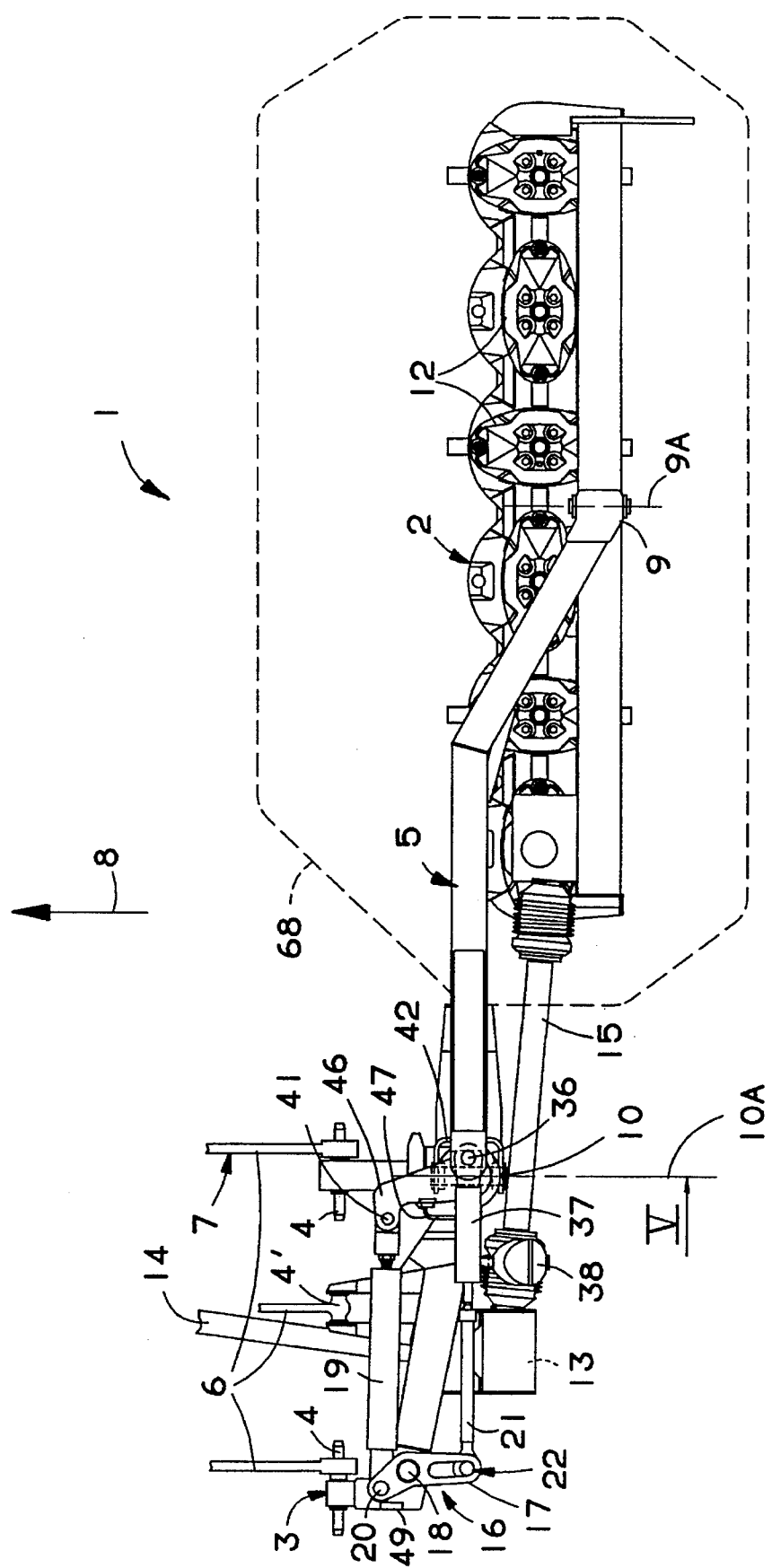
FIG. 1 represents a top view of a mower in normal operating position according to a first example of implementation.

Referring now to the drawings, wherein like reference numerals designate identical or corresponding parts throughout the several views, the mower (1), as shown in FIGS. 1 to 9, includes a cutting mechanism (2), an attachment structure (3) with three points of attachment (4, 4'), and a carrying beam (5) connecting the cutting mechanism (2) to the attachment structure (3).

During operation, the mower (1) is connected by means of the attachment structure (3) to the three points hitching device (6) of a motorized vehicle (7) (only the hitching device (6) of the vehicle has been shown) so that the cutting mechanism (2) extends in a view along the direction of operation (8) laterally on the side of the track of the motorized vehicle (7), and transversely to the direction of operation (8) (in the example shown, the cutting mechanism (2) extends at least approximately orthogonally to the direction of operation (8)).

The cutting mechanism (2) will not be described in detail; indeed it could be of any type (in the example shown it is a cutting mechanism commonly called "disc cutting mechanism").

This cutting mechanism (2) is attached to the carrying beam (5) by means of a first articulation (9) of the pivot type with an axis (9A) directed forward when the cutting mechanism (2) is in normal operating position (in the example shown, the axis (9A) is at least approximately directed in the direction of operation (8), preferably even inclined slightly forward and downward). This first articulation (9) in addition extends at least approximately in the vertical plane directed in the direction of operation (8) and containing the center of mass of the cutting mechanism (2). On the other hand, it extends at the upper part of the cutting mechanism (2) and allows this latter to pivot by a certain angle with respect to the carrying beam (5) in a plane which is orthogonal to the axis (9A) of the articulation (9).

The carrying beam (5) is connected to the attachment structure (3) by means of a second articulation (10) and a third articulation (11), in such a manner that this latter articulation allows the pivoting of the second articulation (10) together with the carrying beam (5) with respect to the attachment structure (3). This second articulation (10) is of the pivot type with an axis (10A) directed forward when the cutting mechanism (2) is in normal operating position (in the example shown, axis (10A) is at least approximately directed in the direction of operation (8)). In the view following the direction of operation (8), it additionally seems that the second articulation (10) extends at least approximately at the same level with respect to the ground as the first articulation (9). The third articulation (11) is also of the pivot type but with its axis (11A) directed upward (in the example shown, axis (11A) is at least approximately vertical). Further, it appears that axis (10A) of the second articulation (10) and axis (11A) of the third articulation (11) are at least approximately intersecting (secant).

The first articulation (9) and the second articulation (10) allow the cutting mechanism (2) to follow the relief of the ground during cutting.

The power supply for the cutting elements (12) of the cutting mechanism (2) is derived from a power source which, in the example shown, is made up by the power take-off (not shown) of the motor vehicle (7). Other power sources are also possible. The power source transmits movement to a gear box (13) by means of a first telescoping transmission shaft (14) with universal joints. The gear box (13) is secured to the attachment structure (3) and extends as seen along the direction of operation (8) between the two lower attachment points (4) of the attachment structure (3). The gear box (3) transmits the movement to the cutting elements (12) of the cutting mechanism (2) by means of a second telescoping transmission shaft (15) with universal joints, which extends transversely to the direction of operation (8). The second articulation (10) and the third articulation (11) extend in the vicinity of, and somewhat higher than, the universal joint of the telescoping transmission shaft (15) located alongside the gear box (13).

The mower (1) also includes a safety device (16) which keeps the cutting mechanism (2) in normal operating position, but allows it to pivot together with the carrying beam (5), toward the rear about axis (11A) of the third articulation (11) when the cutting mechanism (2) strikes an obstacle located in the field during operation.

The safety device (16) includes a pivoting member (17) which is connected to the attachment structure (3) by means of a fourth articulation (18) of the pivot type with an axis (18A) directed upward (in the example shown, axis (18A) is at least approximately parallel to axis (11A) of the third articulation (11)).

The safety device (16) also includes a connecting rod (19) which is attached to the pivoting member (17) by means of a fifth articulation (20) with an axis (20A) which is at least approximately parallel to axis (18A) of the fourth articulation (18).

The safety device (16) also includes an energy accumulator (21) which is linked to the pivoting member (17) by means of a connection (22) in such a manner that the fourth articulation (18) extends between the fifth articulation (20) and the connection (22). The pivoting member (17) thus forms a kind of pivoting lever with two arms (17a, 17b). This connection (22) includes a sixth articulation (23) with an axis (23A) which is at least approximately parallel to axis (18A) of the fourth articulation (18), and a groove (24) which allows modification of the position of this sixth articulation (23) with respect to the fourth articulation (18). Axis (24A) of this groove (24) at least approximately intersects axis (18A) of the fourth articulation (18) and forms an obtuse angle (25) with the geometric axis (26) which intersects axis (18A) of the fourth articulation (18) and axis (20A) of the fifth articulation (20). In the example shown here this obtuse angle (25) has a value of about 150°. It appears that at least in the normal operating position (FIGS. 1 and 6), the obtuse angle (25) is open toward the side opposite the one where the cutting mechanism (2) extends. It also appears that in normal operating position (FIGS. 1 and 6), axis (24A) of the groove (24) forms an angle (28) which is slightly greater than 90° with the direction (27) of the force exerted by the energy accumulator (21).

Figure 4:
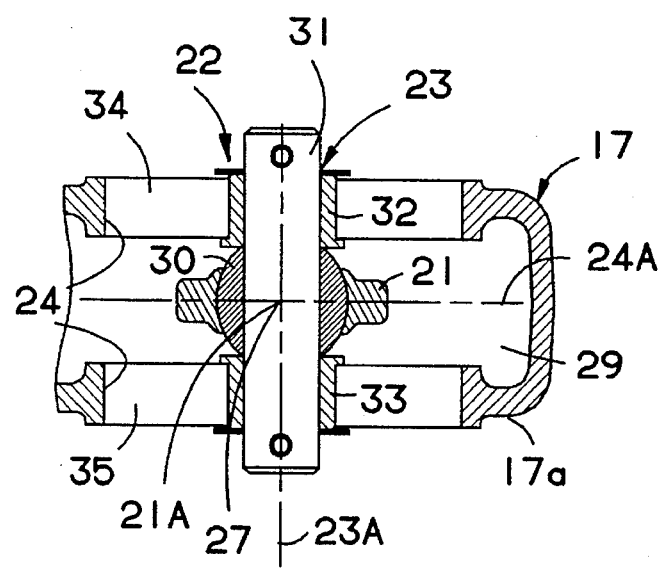
FIG. 4 shows, on an enlarged scale, a partial sectional view along plane IV defined in FIG. 2 of the pivoting member.

As FIG. 4 shows, the arm (17a) of the pivoting member (17) has a hollow space (29) in which the corresponding end of the energy accumulator (21) penetrates. This end includes a ball joint (30) installed on a shaft (31). A roller wheel (32, 33) is provided on one side and the other of this ball joint (30). Said roller wheels (32, 33) are also installed on the shaft (31) and are intended to be able to roll along a corresponding track (34, 35) of the groove (24). The axis of rotation of these roller wheels (32, 33) which corresponds to a longitudinal axis of shaft (31) and to a geometric axis of the ball joint (30), constitutes axis (23A) of the sixth articulation (23), and tracks (34, 35) extend at least approximately orthogonally to this axis (23A). The direction (27) of the force exerted by the energy accumulator (21) in this example merges at least approximately with the longitudinal axis (21A) of the energy accumulator (21). It also appears that direction (27) intersects axis (23A) of the sixth articulation (23) at least approximately orthogonally, and that roller wheels (32, 33) extend at least approximately symmetrically with respect to that direction (27).

Figure 2:
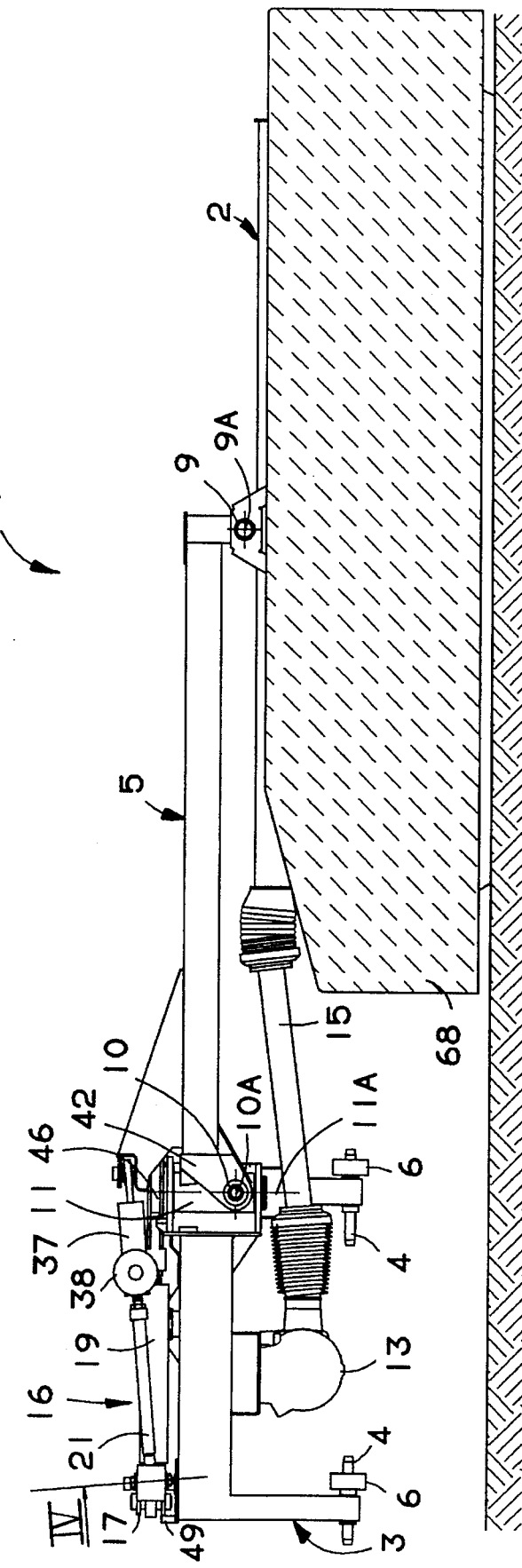
FIG. 2 shows a rear view of the mower of FIG. 1.

At its other end, the energy accumulator (21) is connected to the carrying beam (5) by means of a seventh articulation (36) with an axis (36A) which is at least approximately parallel to axis (18A) of the fourth articulation (18), at least when cutting mechanism (2) is located in the position shown in FIG. 2. This seventh articulation (36) extends in the vicinity of the third articulation (11). Indeed, it extends even somewhat beyond the third articulation (11), on the side of the cutting mechanism (2). It also appears that in the normal operating position (FIGS. 1 and 6), axis (11A) of the third articulation (11), axis (23A) of the sixth articulation (23), and axis (36A) of the seventh articulation (36) are, as seen along axis (18A) of the fourth articulation (18), at least approximately aligned. In FIG. 2 it can also be seen that the seventh articulation (36) extends above the second articulation (10). The force exerted by the energy accumulator (21) thereby creates a moment with respect to axis (10A) of the second articulation (10), which has the effect of reducing the pressure with which the cutting mechanism (2) rests on the ground. The device (16) therefore fulfills a function of lightening the cutting mechanism (2).

In this example of implementation, the energy accumulator (21) comprises a hydraulic jack (37) and a pressure accumulator (38) which is branched to the small chamber of the jack (37). The inflation pressure of the pressure accumulator (38) can be increased by means of a pump (39) or decreased by means of a valve (40).

The connecting rod (19) is connected to the carrying beam (5) (that is to say indirectly connected to the cutting mechanism (2)) by means of an eighth articulation (41) with an axis (41A) which is at least approximately parallel to axis (18A) of the fourth articulation (18). This eighth articulation (41) extends at a certain distance from the third articulation (11) so that the connecting rod (19) can act with a certain lever arm (first lever arm) with respect to axis (11A) of the third articulation (11). It also appears that the geometric axis intersecting axis (11A) of the third articulation (11) and axis (41A) of the eighth articulation (41) form an obtuse angle (67) with a longitudinal axis of the cutting mechanism (2). During normal operation, this obtuse angle (67) is open toward the front.

Figure 5:
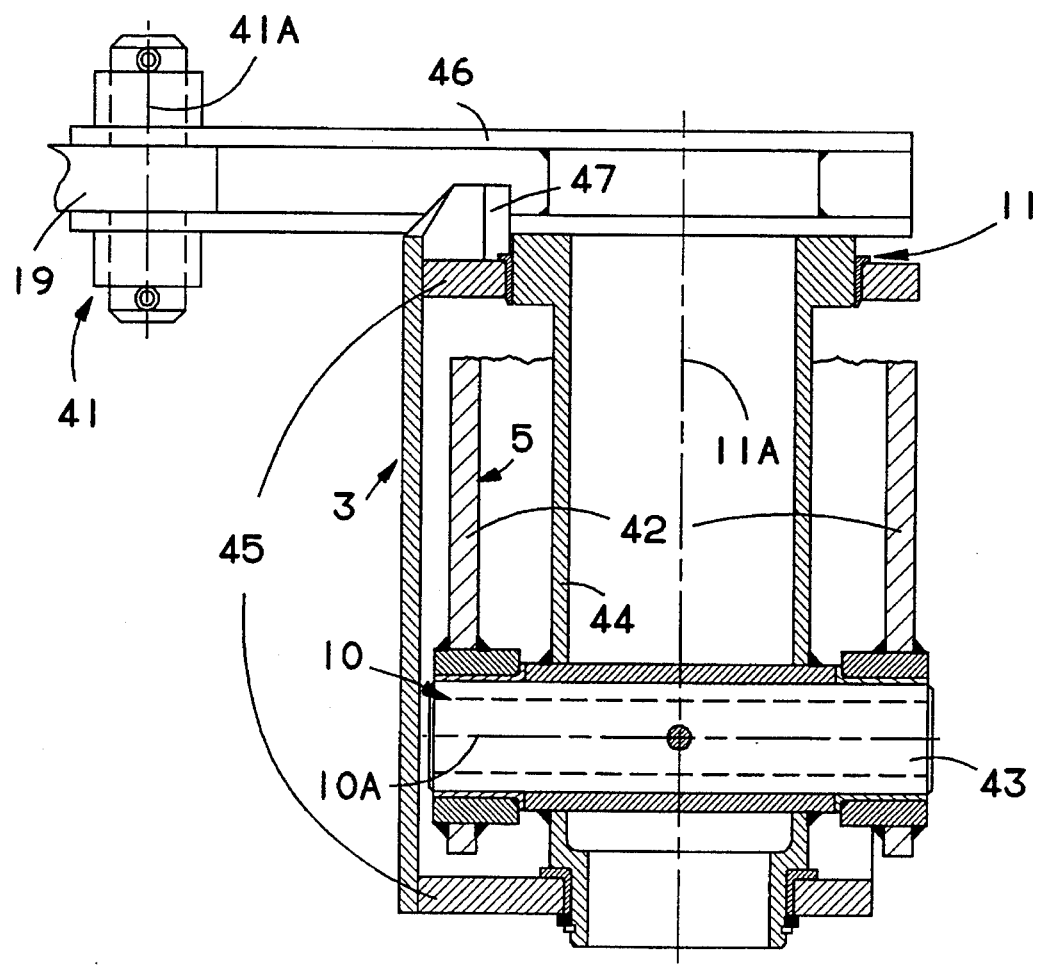
FIG. 5 shows, on an enlarged scale, a sectional view along plane V defined in FIG. 1 of the second articulation, the third articulation and the eighth articulation.

The connecting rod (19) is linked indirectly to the carrying beam (5) as it appears in FIG. 5. The carrying beam (5) includes a yoke (42) by the intermediary of which it can pivot on the two ends of a fixed shaft (43) whose longitudinal axis constitutes axis (10A) of the second articulation (10). This fixed shaft (43) is integral with a tubular shaft (44) which extends between the two flanges of the yoke (42) of the carrying beam (5) and which is able to pivot in a yoke (45) of the attachment structure (3). The longitudinal axis of this tubular shaft (44) constitutes axis (11A) of the third articulation (11). The tubular shaft (44) is provided with an arm (46) at the upper end extending beyond the yoke (45). At the end of said arm (46) the connecting rod (19) is connected by means of the eighth articulation (41).

The normal operating position of the cutting mechanism (2) (FIGS. 1 and 6) is defined by a stop (47). In the example shown here this stop (47) is fixed to the attachment structure (3) and is installed so that it will stop the pivoting of the arm (46) of the tubular shaft (44) about axis (11A) of the third articulation (11) when the cutting mechanism (2) reaches normal operating position. It is understood that this stop could be installed elsewhere provided that it stops the pivoting of the cutting mechanism (2) when the latter reaches normal operating position.

In the example shown here the connecting rod (19) comprises a double-acting hydraulic jack (48). Power for the jack (48) can be ensured by a hydraulic source (not shown) such as the main hydraulic line of the motor vehicle (7) for example.

Another stop (49), which is also fixed to the attachment structure (3), is provided in the vicinity of the pivoting member (17). It is intended to determine the angular range along which the pivoting member (17) can pivot about axis (18A) of the fourth articulation (18).

Figure 6:
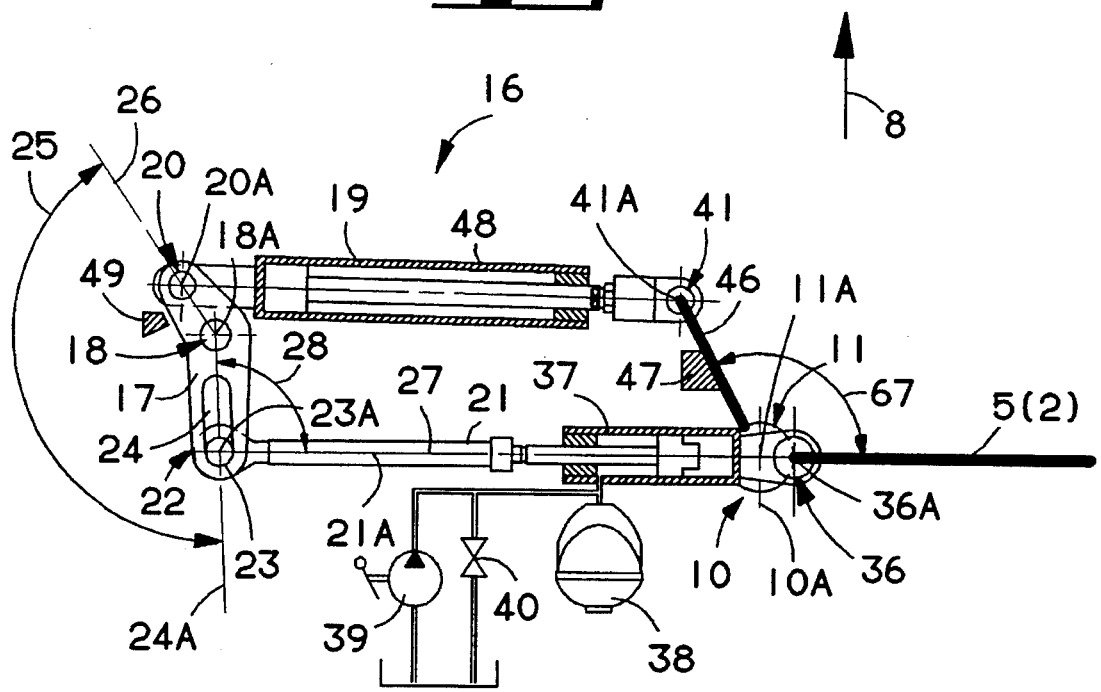
FIG. 6 shows a schematic view of the safety (and lightening) device of the mower in FIGS. 1 to 5 when the cutting mechanism is in normal operating position.

The mower which has just been described operates as follows. Before beginning mowing, the cutting mechanism (2) is pivoted into normal operating position (FIGS. 1, 2 and 6). To achieve this, the hydraulic jack (48) is powered so as to shorten it, causing the energy accumulator (21) to elongate and thereby causing the pivoting of the carrying beam (5) and of the cutting mechanism (2) about axis (11A) of the third articulation (11). The pivoting action stops when the arm (46) arrives in contact with the stop (47). In this position, the energy accumulator (21) has stored a certain amount of energy, the sixth articulation (23) is in the position most distant from the fourth articulation (18), and the length of the jack (48) constituting the connecting rod (19) is invariable. The energy accumulator (21) firmly holds the cutting mechanism (2) in normal operating position and simultaneously reduces the pressure by which the cutting mechanism (2) rests on the ground.

Figure 7:
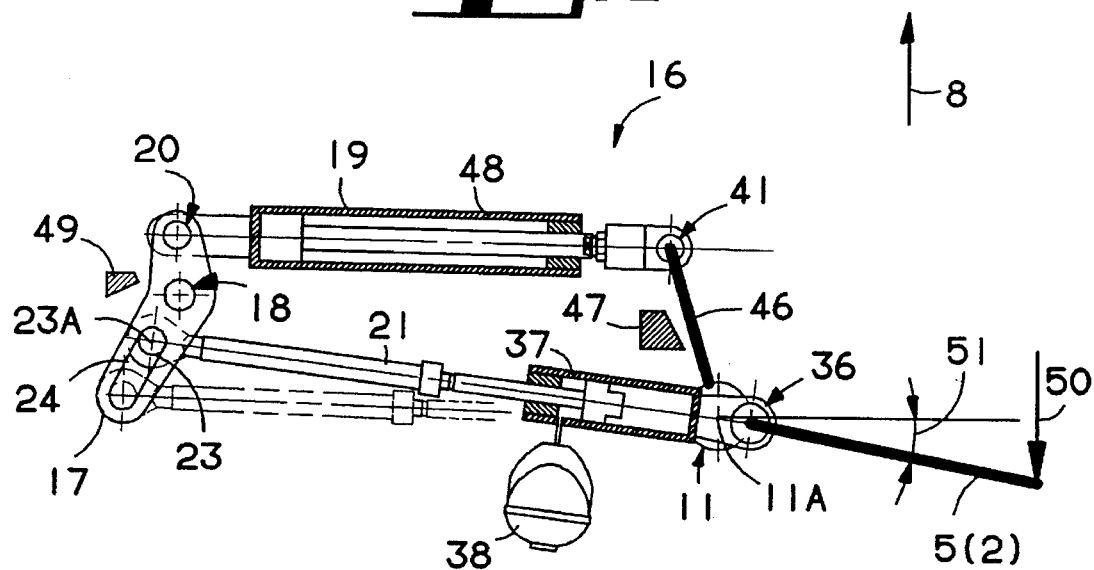
FIG. 7 shows a schematic view of the safety (and lightening) device when the cutting mechanism arrives at the end of the first phase of disengagement (dashed lines) and begins the second phase of disengagement (full lines)
Figure 8:
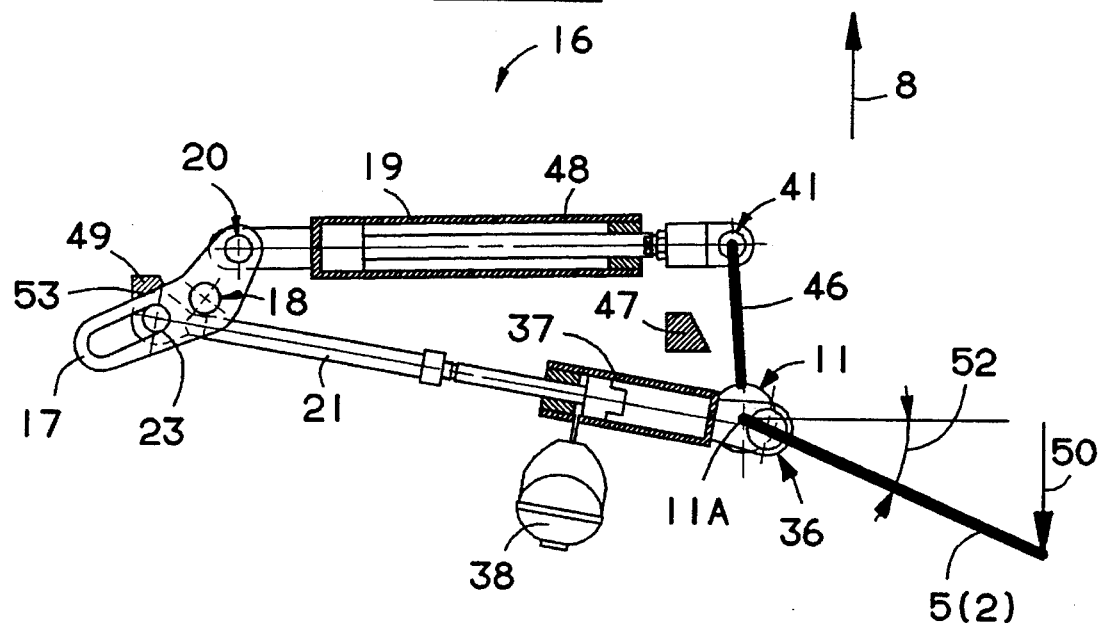
FIG. 8 shows a schematic view of the safety (and lightening) device when the cutting mechanism arrives at the end of the second phase of disengagement (total disengagement)

If during operation the cutting mechanism (2) strikes an obstacle (this results in a force (50) on the cutting mechanism (2)—FIG. 7), it will pivot backward about axis (11A) of the third articulation (11). Once this happens, the arm (46) will pull on the connecting rod (19) (jack (48) is blocked) which causes the pivoting member (17) to pivot about axis (18A) of the fourth articulation (18) so as to elongate the energy accumulator (21). During this first phase the pressure in the pressure accumulator (38) increases. The force exerted by the energy accumulator (21) on the pivoting member (17) increases as well as the intensity of the force (50).

One should note that during this first phase the pressure with which the cutting mechanism (2) rests on the ground will indeed decrease, but that the cutting mechanism (2) will remain in contact with the ground.

If the obstacle can be cleared during this first phase the energy accumulator (21) will again bring the cutting mechanism (2) into normal operating position.

If the obstacle cannot be cleared during the first phase, the pivoting of the cutting mechanism (2) to the rear continues until the angle (51) reaches a certain value (11° in the example shown). The position of the energy accumulator (21) and of the sixth articulation (23) immediately before reaching the limiting angle is shown in dashed lines in FIG. 7.

As soon as the limiting angle is reached, the roller wheels (32, 33) will roll along the groove (24) and will shift the sixth articulation (23) into a position closest to axis (18A) of the fourth articulation (18). This position has been shown in full lines in FIG. 7. In this new position, the lever arm (second lever arm) with which the energy accumulator (21) is acting is more reduced (in the example shown it has been approximately reduced by half and is, in the new position, of the same order of magnitude as the lever arm with which the connecting rod (19) acts on the pivoting member (17)). This causes redistribution of forces in the safety device (16) and consequently results in a considerable decrease of the force (50) required to continue wearing away of the cutting mechanism (2) in front of the obstacle by continuing pivoting toward the rear about axis (11A) of the third articulation (11). The pivoting is stopped when the cutting mechanism (2) has reached the angle (52) of total disengagement which is determined by the side (53) of the stop (49) against which the pivoting member (17) comes to rest. In the example shown here this angle of total disengagement is about 23°. It should also be noted that by judicious selection of the relative position of the different articulations of the safety device (16), the force (50) required to continue the pivoting of the cutting mechanism (2) during the second phase can remain at least approximately constant, or even decrease while the pressure in the pressure accumulator (38) continues to increase until a certain limiting value is reached. This is beneficial for the various components of the machine.

During this second phase the force exerted by the energy accumulator (21) can become sufficient to raise the cutting mechanism (2) from the ground and lift it so that it can pass over the obstacle, depending on the nature of this obstacle.

As soon as the obstacle is no longer acting on the cutting mechanism (2), the energy stored in the energy accumulator (21) will cause it to shorten. Once this happens, the energy accumulator (21) will pull on the pivoting member (17) which will then pull on the connecting rod (19) which will cause the cutting mechanism (2) to pivot about axis (11A) of the third articulation (11) until the normal operating position is reached. Simultaneously, the cutting mechanism (2) will return in contact with the ground. As axis (24A) of the groove (24) forms with the direction (27) of the force exerted by the energy accumulator (21) an angle (28) which is somewhat greater than 90°, one can ensure that the sixth articulation (23) will return to normal operating position where it is farthest from the fourth articulation (18).

Figure 3:
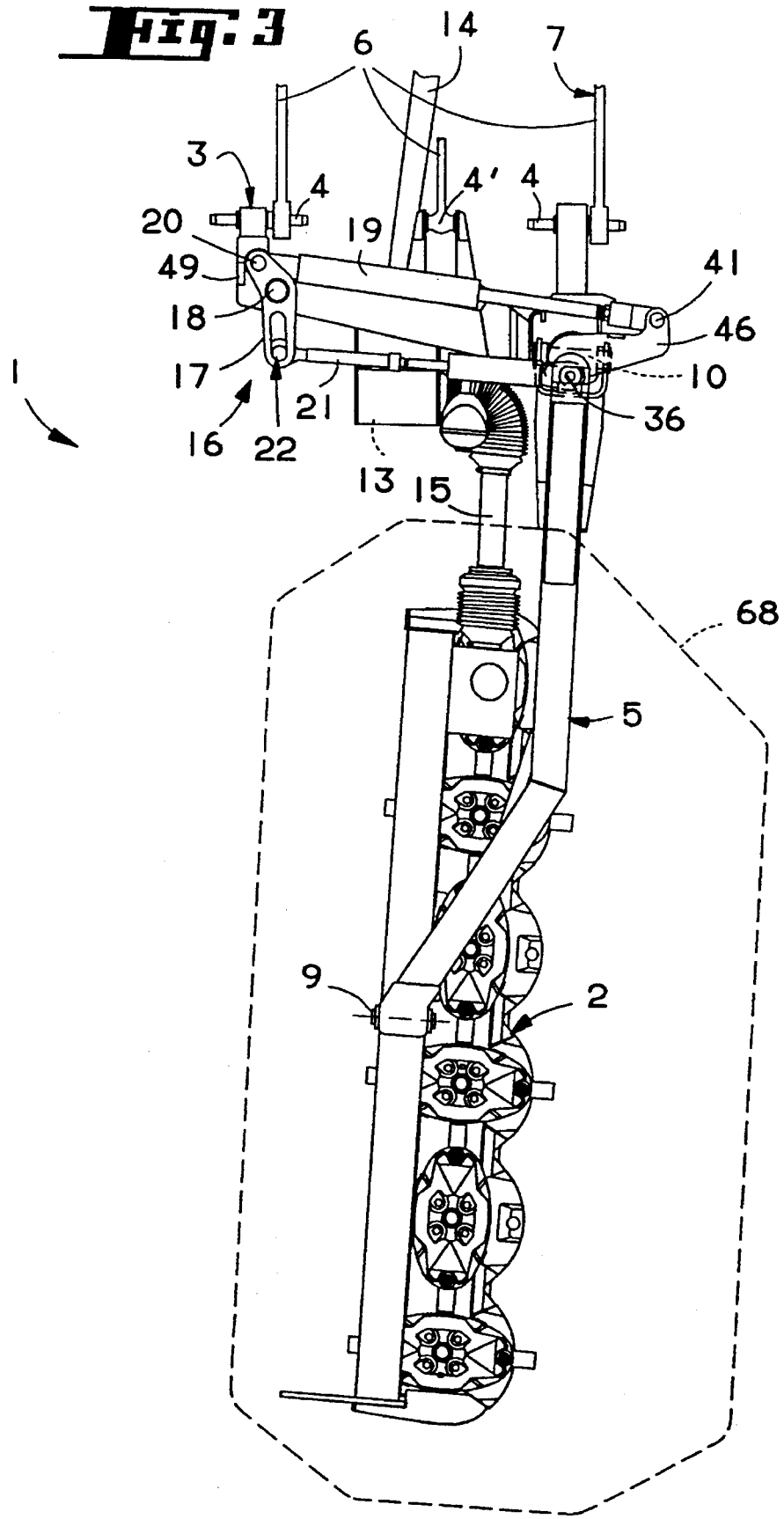
FIG. 3 shows a top view of the mower of FIGS. 1 and 2, in transport position.
Figure 9:
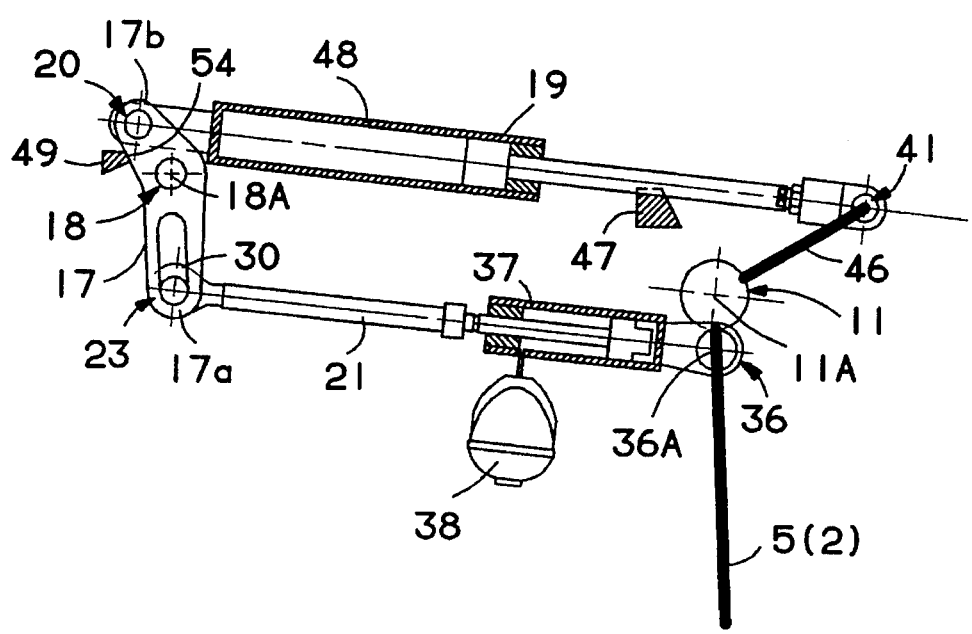
FIG. 9 shows a schematic view of the safety (and lightening) device when the cutting mechanism is in transport position.

When the operation is completed, the mower (1) is placed in transport position (FIGS. 3 and 9). To do this, the hydraulic jack (48) is powered so as to lengthen it which has the effect of causing some pivoting of the pivoting member (17) about axis (18A) of the fourth articulation (18) until there is contact with the side (54) of the stop (49), and thereafter causing pivoting of the carrying beam (5) together with the cutting mechanism (2) toward the rear about axis (11A) of the third articulation (11). In the example shown here the transport position is reached when the hydraulic jack (48) will have reached its maximum length. In any case a stop could be used to determine this transport position. Keeping the cutting mechanism (2) in the transport position is accomplished hydraulically by means of the jack (48), or mechanically by means of a bolt (not shown), which automatically engages when the transport position is reached and which can be neutralized by the operator from the motorized vehicle (7) by means of a remote control (not shown) when the cutting mechanism (2) must be put back into operating position. Since in the normal operating position the seventh articulation (36) extends beyond the third articulation (11) on the side of the cutting mechanism (2), beginning at a certain pivoting angle the energy accumulator (21) will also assist in achieving the transport position.

In transport position the cutting mechanism (2) and the carrying beam (5) are located behind the motor vehicle (7) in the prolongation of the vehicle. In this position stops (not shown) can block the first articulation (9) and the second articulation (10).

The pivoting of the cutting mechanism (2) in transport position does not require removal of the universal joint transmission shaft (15).

Figure 12:
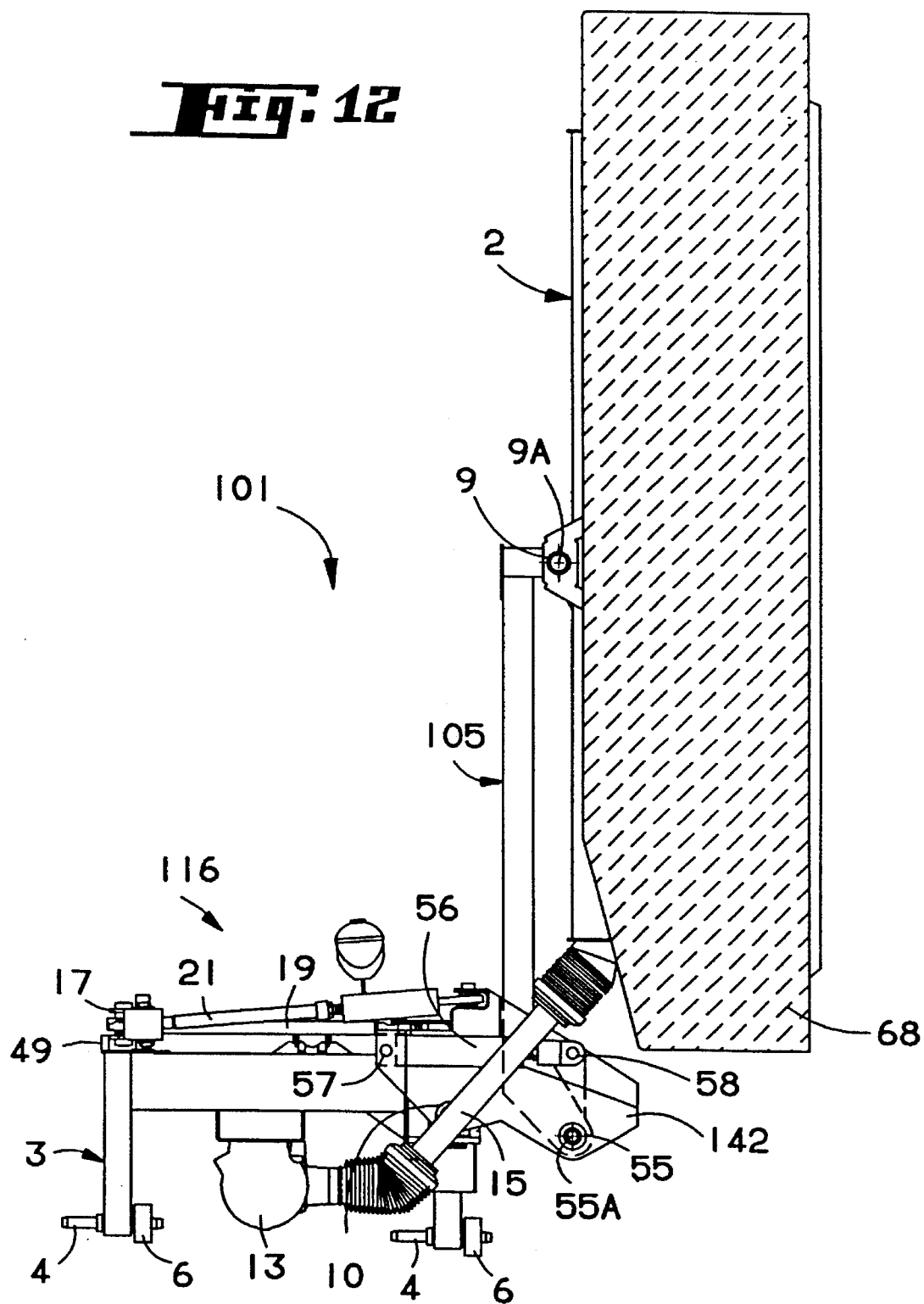
FIG. 12 shows a rear view of the mower of FIGS. 10 and 11, in transport position.
Figure 13:
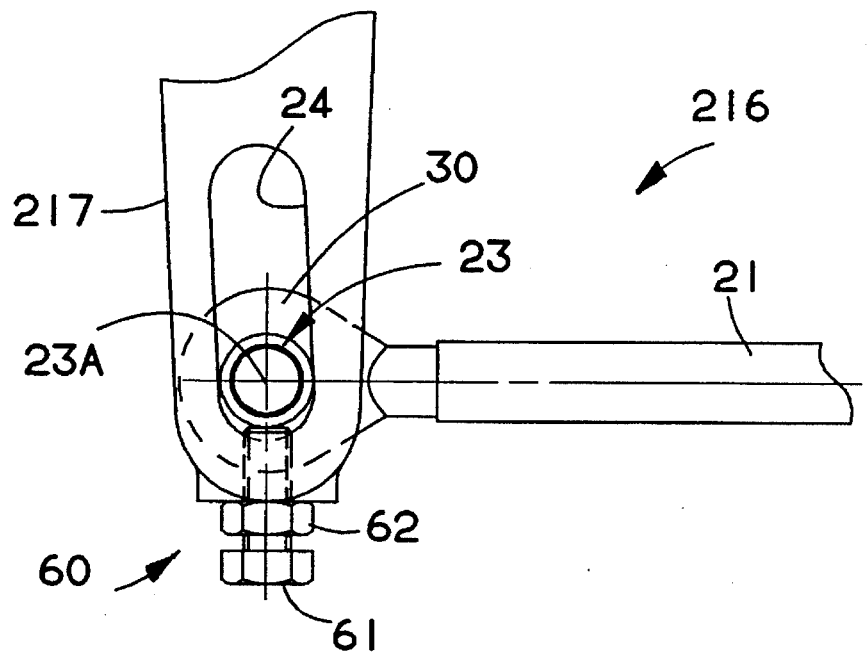
FIG. 13 shows, on an enlarged scale, another example of implementation of the pivoting member.
Figure 14:
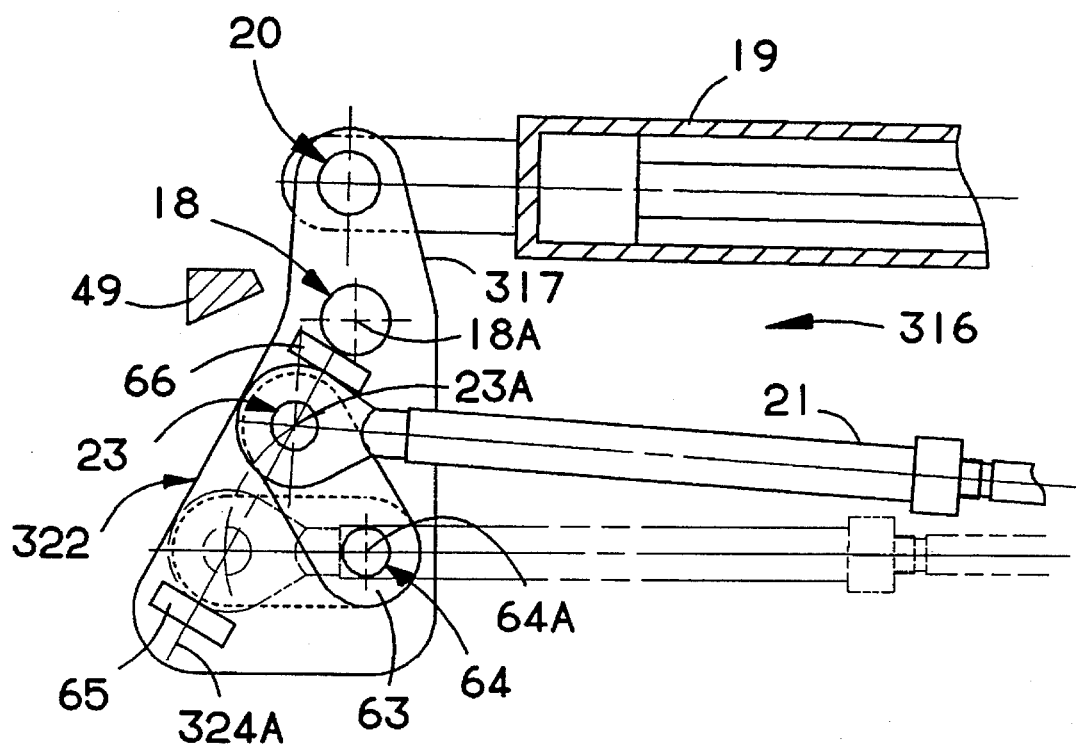
FIG. 14 shows, on an enlarged scale, another example of implementation of the connection of the energy accumulator to the pivoting member.

The examples of implementation shown in FIGS. 10 to 14 include a certain number of components which have been described previously. These components will consequently keep the same reference number and will not be described again. These examples also include a certain number of components which are comparable to components of the mower of the preceding example. These components will be assigned the same reference number as the comparable components of the mower in the preceding example increased by one hundred (FIGS. 10 to 12), two hundred (FIG. 13), and three hundred (FIG. 14). They will only be described if it becomes necessary to do so.

In the mower (101) of FIGS. 10 to 12 the carrying beam (105) is connected to the attachment structure (3) by means of an intermediate piece (142). This intermediate piece (142) is connected to the attachment structure (3) by means of the second articulation (10) and the third articulation (11). The carrying beam (105) is connected to this intermediate piece (142) by means of a ninth articulation (55) of the pivot type with an axis (55A) directed forward when the cutting mechanism (2) is in normal operating position (in the example of implementation shown, axis (55A) is at least approximately parallel to axis (10A) of the second articulation (10)). As seen along the direction of operation (8) it is also apparent that the ninth articulation (55) extends at least approximately at the same level with respect to the ground as the first articulation (9) and as the second articulation (10). It also appears that the ninth articulation (55) extends somewhat above the central part of the universal joint telescoping transmission shaft (15).

The mower (101) also includes a maneuvering element (56) attached on one hand to the intermediate piece (142) by means of a tenth articulation (57) and to the carrying beam (105) by means of an eleventh articulation (58). In the example shown here axis (57A) of the tenth articulation (57) and axis (58A) of the eleventh articulation (58) are at least approximately parallel to axis (55A) of the ninth articulation (55). This maneuvering element (56) which is made in the form of a hydraulic jack that can be powered by means of a hydraulic source such as the main hydraulic line of the motor vehicle (7), allows one to pivot the carrying beam (105) together with the cutting mechanism (2) upward about axis (55A) of the ninth articulation (55) in order to bring the cutting mechanism (2) into a transport position in which it is directed upward (FIG. 12). In the example shown here the cutting mechanism (2) is at least approximately vertical in transport position. The pivoting of the cutting mechanism (2) in its transport position also does not require removal of the universal joint telescoping transmission shaft (15).

It can also be advantageously provided that in transport position the pivoting of the cutting mechanism (2) about axis (9A) of the first articulation (9) and the pivoting of the carrying beam (105) and of the intermediate piece (142) about axis (10A) of the second articulation (10) be blocked. Preferably this blocking can be accomplished automatically at the time of pivoting in transport position.

In the operating position the pivoting of the carrying beam (105) and of the cutting mechanism (2) with respect to the intermediate piece (142) about axis (55A) of the ninth articulation (55) is blocked at least in the downward direction. This blocking is achieved downward by a stop (59) integral with the intermediate piece (142) and intended to come into contact with the carrying beam (105). If blocking in the upward direction is desired, this can be ensured, for examples, by the hydraulic jack (double-acting) which constitutes the maneuvering element (56). Thus, the energy accumulator (21) which is linked to the intermediate piece (142) by means of the seventh articulation (36) can reduce the pressure with which the cutting mechanism (2) rests on the ground.

The safety device (116) is identical to that described previously except for the connecting rod (119) which here is made of a simple tie-rod.

FIG. 13 shows another method of implementation of a safety device (216) or, more specifically, an adjusting device (60) allowing one to adjust the normal operating position of the sixth articulation (23) with respect to the fourth articulation (18) of the pivoting member (217) which is entirely comparable to the pivoting member (17) described previously.

The adjusting device (60) comprises a screw (61) which is screwed into the pivoting member (217) and against which the ball joint (30) of the energy accumulator (21) rests. By screwing the screw (61) into the pivoting member (217) more or less deeply one brings the sixth articulation (23) more or less closer to the fourth articulation (18). The adjusting device (60) also includes a lock nut (62) allowing one to hold the position of the screw (61).

By means of this adjusting device (60) it is possible to adjust the intensity of the initial force which is necessary to apply on the cutting mechanism (2) in order to cause it to pivot toward the rear in case an obstacle is encountered, without this adjustment having an influence on the value of pressure with which the energy accumulator (21) allows the cutting mechanism (2) to rest on the ground.

FIG. 14 shows, more or less in the form of a schematic diagram, another example of implementation of a safety device (316) and, more specifically, of the connection (322) connecting the energy accumulator (21) to the pivoting member (317).

In this example of implementation, the connection (322) includes a pivoting lever (63) connected at one of its ends to the pivoting member (317) by means of a joint (64) of the pivot type with an axis (64A) which is at least approximately parallel to axis (18A) of the fourth articulation (18). The energy accumulator (21) is connected to the other end of the pivoting lever (63) by means of the sixth articulation (23). It is also apparent that the sixth articulation (23) extends beyond the joint (64) connecting the pivoting lever (63) to the pivoting member (317).

The connection (322) also includes two stops (65, 66) between which the pivoting lever (63) can pivot. One (65) of them defines the position of the pivoting lever (63) in which the sixth articulation (23) is moved away from the fourth articulation (18) (shown in dashed lines), and the other (66) defines the position of the pivoting lever (63) in which the sixth articulation (23) is brought closer to the fourth articulation (18) (shown in full lines).

It also is apparent that the straight line (324A) passing on the one hand through axis (23A) when the sixth articulation (23) is moved away from the fourth articulation (18), and on the other hand going through axis (23A) when the sixth articulation (23) is brought closer to the fourth articulation (18), at least approximately intersects axis (18A) of the fourth articulation (18).

In normal operating position, the pivoting lever (63) is located in the position shown by the dashed lines. When the cutting mechanism (2), after striking an obstacle, has reached the limiting angle (51) (FIG. 7), the pivoting lever (63) will pivot in the position shown by the full lines. The result of this will be identical to that described previously.

In this example of implementation, in normal operating position, the straight line (324A) also advantageously forms an angle somewhat greater than 90° with the direction (27) of the force exerted by the energy accumulator (21). Moreover, in this position, axis (11A) of the third articulation (11), axis (23A) of the sixth articulation (23), and axis (36A) of the seventh articulation (36) are at least approximately aligned.

In this example of implementation one could obviously also install the adjusting device (60) as described previously.

In FIGS. 1 to 3 and 10 to 12 it will also be apparent that the cutting mechanism (2) includes a protection device (68). This is represented by dashed lines in FIGS. 1, 3 and 10 and in full lines in FIGS. 2, 11 and 12.

Various modifications can be made to the examples which have just been described without departing from the scope of the invention.

For example, it is apparent that the energy accumulator could be of the entirely pneumatic type or of the mechanical type (spring).

Instead of the safety device resorting to an energy accumulator which works on the pulling principle, it is also possible to provide a device which uses an energy accumulator which works by the compression principle.

In the examples described here, the cutting mechanism is connected to the carrying beam by a first articulation which is installed in its central part. But the invention also pertains to mowers whose carrying beam is connected to one end of the cutting mechanism.

This cutting mechanism can be of any type whatsoever which is used for harvesting crop, for maintenance of green spaces, for crushing vegetables, and so forth.

It is also possible to combine it with members which are used to treat the cut product, such as processing members for example.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower comprising:
   a cutting mechanism extending during operation transversely to a direction of operation of the mower;
   an attachment structure which is adapted to be connected to a motor vehicle;
   a carrying beam connected on one hand to the cutting mechanism by means of a first articulation having an axis directed forward, and on the other hand to the attachment structure by means of a second articulation having an axis directed forward and by means of a third articulation having an axis directed upward, which permits pivoting of the second articulation with respect to the attachment structure; and
   a safety device which maintains the cutting mechanism in a normal operating position, but allows the cutting mechanism to pivot rearwardly about the axis of the third articulation in case an obstacle is encountered, the safety device including an energy accumulator;
   wherein:
   the safety device further comprises a pivoting member connected to the attachment structure by means of a fourth articulation, and a connecting rod connected on one hand indirectly to the carrying beam with a first lever arm with respect to the axis of the third articulation, and on the other hand to the pivoting member by means of a fifth articulation, the energy accumulator being connected to the pivoting member by means of a connection so as to act on said pivoting member with a second lever arm, said connection being capable, from a certain pivoting angle of the cutting mechanism toward the rear, of decreasing said second lever arm with which the energy accumulator acts on the pivoting member.

2. A mower according to claim 1, wherein the connection is capable of rapidly decreasing said second lever arm.

3. A mower according to claim 1, wherein the connection includes a sixth articulation.

4. A mower according to claim 3, wherein an axis of the sixth articulation is at least approximately parallel to an axis of the fourth articulation.

5. A mower according to claim 3, wherein the connection further includes a groove which allows a modification of a position of the sixth articulation with respect to the fourth articulation.

6. A mower according to claim 5, wherein the connection includes at least one roller wheel whose axis of rotation constitutes an axis of the sixth articulation and which rolls along the groove.

7. A mower according to claim 6, wherein the connection includes at least one roller wheel on either side of a direction of a force exerted by the energy accumulator, the roller wheels each rolling in a corresponding track of the groove.

8. A mower according to claim 7, wherein the roller wheels extend at least approximately symmetrically on both sides of the direction of the force exerted by the energy accumulator.

9. A mower according to claim 3, wherein the connection further includes a pivoting lever which is connected to the pivoting member by means of a joint and to which the energy accumulator is connected by means of the sixth articulation which is provided beyond the said joint, the pivoting of the said pivoting lever with respect to the pivoting member about an axis of the said joint being limited by two stops which are integral with the pivoting member.

10. A mower according to claim 9, wherein the axis of the joint is at least approximately parallel to an axis of the fourth articulation.

11. A mower according to claim 3, wherein a straight line passing on one hand through an axis of the sixth articulation when the sixth articulation is located in a first extreme position and on the other hand through the axis of the sixth articulation when the sixth articulation is located in a second extreme position, at least approximately intersects an axis of the fourth articulation.

12. A mower according to claim 11, wherein a geometric axis intersecting the axis of the fourth articulation and an axis of the fifth articulation forms an obtuse angle with the said straight line.

13. A mower according to claim 12, wherein during normal operation the obtuse angle is open toward a side opposite a side where the cutting mechanism extends.

14. A mower according to claim 11, wherein during normal operation the said straight line forms an angle somewhat greater than 90° with a direction of a force exerted by the energy accumulator.

15. A mower according to claim 3, wherein a normal operating position of the sixth articulation with respect to the fourth articulation is adjustable by means of an adjusting device.

16. A mower according to claim 15, wherein the adjusting device essentially controls the second lever arm with which the energy accumulator acts on the pivoting member.

17. A mower according to claim 3, wherein a direction of a force exerted by the energy accumulator intersects at least orthogonally an axis of the sixth articulation.

18. A mower according to claim 1, wherein an axis of the fifth articulation is at least approximately parallel to an axis of the fourth articulation.

19. A mower according to claim 1, wherein the energy accumulator is connected directly or indirectly to the attachment structure or to the carrying beam or to the cutting mechanism by means of a seventh articulation.

20. A mower according to claim 19, wherein an axis of the seventh articulation is at least approximately parallel to an axis of the fourth articulation.

21. A mower according to claim 19, wherein the seventh articulation extends in the vicinity of the third articulation.

22. A mower according to claim 21, wherein the seventh articulation extends beyond the third articulation, on a side of the cutting mechanism.

23. A mower according to claim 19, wherein the connection includes a sixth articulation and wherein in a normal operating position the axis of the third articulation, an axis of the sixth articulation and an axis of the seventh articulation are at least approximately aligned.

24. A mower according to claim 1, wherein the connecting rod is connected directly or indirectly to the carrying beam or to the cutting mechanism by means of an eighth articulation.

25. A mower according to claim 24, wherein an axis of the eighth articulation is at least approximately parallel to an axis of the fourth articulation.

26. A mower according to claim 24, wherein a geometric axis intersecting the axis of the third articulation and an axis of the eighth articulation forms an obtuse angle with a longitudinal axis of the cutting mechanism.

27. A mower according to claim 1, wherein an axis of the fourth articulation is directed upward, preferably at least approximately vertically.

28. A mower according to claim 27, wherein the axis of the fourth articulation is at least approximately parallel to the axis of the third articulation.

29. A mower according to claim 1, wherein in a normal operating position the energy accumulator and the connecting rod extend transversely to the direction of operation and preferably at least approximately parallel to the cutting mechanism.

30. A mower according to claim 1, wherein the pivoting member can pivot about an axis of the fourth articulation within a certain predetermined angular range.

31. A mower according to claim 30, wherein the said angular range is determined by stops integral with the attachment structure and intended to work with the pivoting member.

32. A mower according to claim 1, wherein the second articulation and the third articulation extend in the vicinity of one another, their axes preferably being intersecting.

33. A mower according to claim 1, wherein the pivoting angle of the cutting mechanism at which the second lever arm with which the energy accumulator acts on the pivoting member is decreased, has a value of about 10°.

34. A mower according to claim 1, wherein the energy accumulator includes a jack and a pressure accumulator.

35. A mower according to claim 34, wherein an inflation pressure of the pressure accumulator is adjustable.

36. A mower according to claim 1, wherein the connecting rod comprises a jack.

37. A mower according to claim 36, wherein a pivoting of the cutting mechanism forward or forward and backward about the axis of the third articulation is limited by a respective stop.

38. A mower according to claim 36, wherein in a transport position a pivoting of the cutting mechanism about the axis of the first articulation and a pivoting of the carrying beam about the axis of the second articulation is blocked.

39. A mower according to claim 1, wherein the energy accumulator is linked directly or indirectly to the carrying beam or to the cutting mechanism by means of a seventh articulation whose position with respect to the second articulation is such that the energy accumulator reduces a pressure with which the cutting mechanism rests on a ground.

40. A mower according to claim 1, wherein the carrying beam is connected to the attachment structure by means of an intermediate piece which itself is connected to the attachment structure by means of the second articulation, the carrying beam being connected to this intermediate piece by means of a ninth articulation with an axis directed forward.

41. A mower according to claim 40, wherein the energy accumulator is connected directly or indirectly to the intermediate piece by means of a seventh articulation and wherein a pivoting of the carrying beam with respect to the intermediate piece about the axis of the ninth articulation is limited at least in a downward direction by a stop.

42. A mower according to claim 40, wherein a maneuvering element is installed between the intermediate piece and the carrying beam in order to cause pivoting of the carrying beam and of the cutting mechanism upward about the axis of the ninth articulation.

43. A mower according to claim 42, wherein the maneuvering element comprises a jack.

44. A mower according to claim 1, wherein the axis of the first articulation and/or the axis of the second articulation are at least approximately directed along the direction of operation.

45. A mower according to claim 40, wherein the axis of the first articulation and/or the axis of the second articulation and/or the axis of the ninth articulation are at least approximately directed along the direction of operation.

46. A mower comprising:

a cutting mechanism extending during operation transversely to a direction of operation of the mower;

an attachment structure which is adapted to be connected to a motor vehicle;

a carrying beam connected on one hand to the cutting mechanism by means of a first articulation having an axis directed forward, and on the other hand to the attachment structure by means of a second articulation having an axis directed forward and by means of a third articulation having an axis directed upward, which permits pivoting of the second articulation with respect to the attachment structure; and a safety device which maintains the cutting mechanism in a normal operating position, but allows the cutting mechanism to pivot rearwardly about the axis of the third articulation in case an obstacle is encountered, the safety device including an energy accumulator;

wherein:

the safety device further comprises a pivoting member connected to the attachment structure by means of a fourth articulation, and a connecting rod connected on one hand directly to the carrying beam with a first lever arm with respect to the axis of the third articulation, and on the other hand to the pivoting member by means of a fifth articulation, the energy accumulator being connected to the pivoting member by means of a connection so as to act on said pivoting member with a second lever arm, said connection being capable, from a certain pivoting angle of the cutting mechanism toward the rear, of decreasing said second lever arm with which the energy accumulator acts on the pivoting member.

47. A mower comprising:

a cutting mechanism extending during operation transversely to a direction of operation of the mower;

an attachment structure which is adapted to be connected to a motor vehicle;

a carrying beam connected on one hand to the cutting mechanism by means of a first articulation having an axis directed forward, and on the other hand to the attachment structure by means of a second articulation having an axis directed forward and by means of a third articulation having an axis directed upward, which permits pivoting of the second articulation with respect to the attachment structure; and a safety device which maintains the cutting mechanism in a normal operating position, but allows the cutting mechanism to pivot rearwardly about the axis of the third articulation in case an obstacle is encountered, the safety device including an energy accumulator;

wherein:

the safety device further comprises a pivoting member connected to the attachment structure by means of a fourth articulation, and a connecting rod connected on one hand directly to the cutting mechanism with a first lever arm with respect to the axis of the third articulation, and on the other hand to the pivoting member by means of a fifth articulation, the energy accumulator being connected to the pivoting member by means of a connection so as to act on said pivoting member with a second lever arm, said connection being capable, from a certain pivoting angle of the cutting mechanism toward the rear, of decreasing said second lever arm with which the energy accumulator acts on the pivoting member.

48. A mower comprising:

a cutting mechanism extending during operation transversely to a direction of operation of the mower;

an attachment structure which is adapted to be connected to a motor vehicle;

a carrying beam connected on one hand to the cutting mechanism by means of a first articulation having an axis directed forward, and on the other hand to the attachment structure by means of a second articulation having an axis directed forward and by means of a third articulation having an axis directed upward, which permits pivoting of the second articulation with respect to the attachment structure; and a safety device which maintains the cutting mechanism in a normal operating position, but allows the cutting mechanism to pivot rearwardly about the axis of the third articulation in case an obstacle is encountered, the safety device including an energy accumulator;

wherein:

the safety device further comprises a pivoting member connected to the attachment structure by means of a fourth articulation, and a connecting rod connected on one hand indirectly to the cutting mechanism with a first lever arm with respect to the axis of the third articulation, and on the other hand to the pivoting member by means of a fifth articulation, the energy accumulator being connected to the pivoting member by means of a connection so as to act on said pivoting member with a second lever arm, said connection being capable, from a certain pivoting angle of the cutting mechanism toward the rear, of decreasing said second lever arm with which the energy accumulator acts on the pivoting member.

\* \* \* \* \*